April 4, 1944.  C. G. KRONMILLER  2,345,981
CONDITION CONTROL MEANS
Filed April 15, 1942
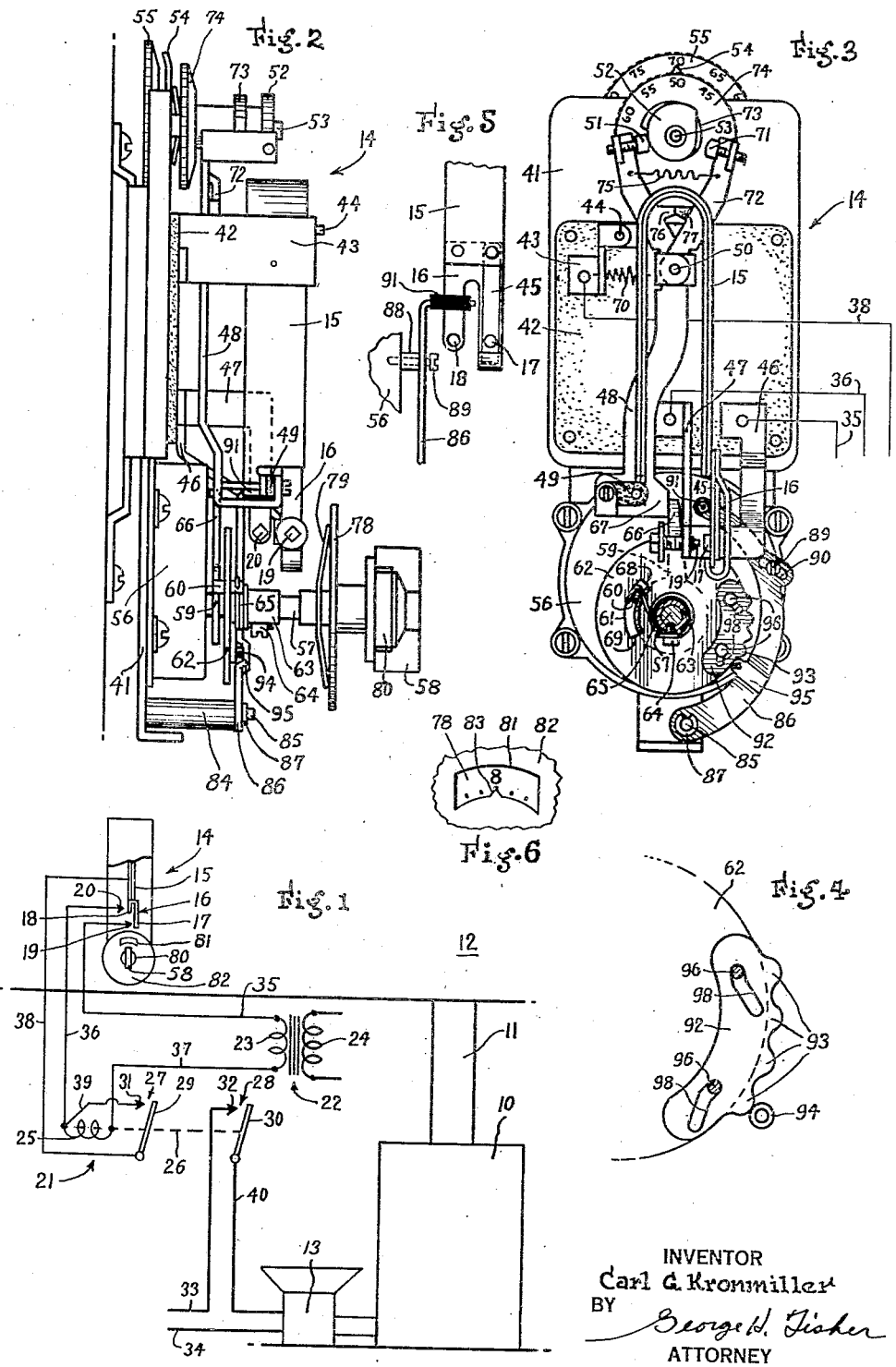
INVENTOR
Carl G. Kronmiller
BY
George H. Fisher
ATTORNEY Patented Apr. 4, 1944

2,345,981

UNITED STATES PATENT OFFICE 2,345,981

CONDITION CONTROL MEANS

Carl G. Kronmiller, Minneapolis, Minn., assignor to Minneapolis-Honeywell Regulator Company, Minneapolis, Minn., a corporation of Delaware Application April 15, 1942, Serial No. 439,062

17 Claims. (Cl. 236—46)

This invention relates to means for controlling a physical condition such as temperature, humidity, or pressure, but more particularly to a control means for providing close regulation of a condition in a condition control system of the type wherein an inherent time lag exists between the time a condition changer is set in operation to establish a particular condition value and the time when the operation becomes effective to establish such value.

It is a well known characteristic of all heating systems, for example, that a definite time elapses between the time a heating means operates to increase the temperature value of a space and the time the temperature of the space begins to rise as a result of the additional heat supplied thereto. Consequently, by the time the temperature of the space has risen to the desired value, and operation of the heating means has been terminated, a reserve heat supply has been stored by the heating means which continues to flow to the space to raise the temperature therein above the desired value.

Such an objectional condition, well known in the art as "overshooting," is particularly present in heating systems of the type wherein the heating apparatus is started and stopped in accordance with space temperatures such as stokers, oil burners, and the like, the overshooting resulting from extended operation thereof over long periods of time. In the case of stoker operation wherein the fuel is fed at a rate in excess of the combustion rate thereof, a mass of unburned fuel accumulates in the combustion chamber during such an extended period of stoker operation which continues to heat the heat transfer medium long after operation of the stoker has been discontinued. The reserve heat thus produced is further augmented by reserve heat stored in the heat transfer medium if the system is one in which the medium has heat storing capacity as in the case of a hot water system.

Overshooting might as readily result, however, in any heating system wherein a reserve of heat is stored as a result of prolonged heat increasing activity of the heating means, as might be caused, for example, by a low rate of heat transfer between the heat source and the space to be heated.

A broad object of this invention is to obviate the above mentioned objectional overshooting by providing means for preventing continuous operation of the condition changer when the same operates to satisfy a condition indicative of a need for prolonged operation thereof.

Another object is to provide, in a condition control system of the type described wherein a condition changer is controlled by means responsive to variations in the value of the condition, means operable independently of the control means and variations in the value of the condition for preventing continuous operation of the condition changer when the same operates to satisfy a condition indicative of a need for prolonged operation thereof.

A further object is to provide means for preventing continuous operation of the condition changer when the control means is shifted from one position to the other and the condition changer operates to change the condition from a value of one range to a value of the other.

The invention has a particularly advantageous application to temperature control systems of the day-night type in which a space is maintained at one temperature value during the night, and timed means is provided for shifting the system from night to day operation. In such a system prolonged operation of the heating means extending over a period of time, commonly referred to as a morning pick-up period, is required to raise the temperature of the space from the low night value to the normal daytime value.

Accordingly, an object of this invention is to provide, in a day-night system of the type described, a means operable by the timed means for causing intermittent operation of the heating means when the same operates to raise the temperature of the space from the night to the day time value.

Another object is the provision, in a day-night system of the class described, of means operable by the timed means for intermittently actuating the control means in a manner to provide intermittent operation of the heating means in a sequence of predetermined intervals extending over a predetermined period of time following the return of the control means to the daytime setting thereof.

Another object is to provide, in a day-night system in which a timed means is set in operation by the manual adjustment of the night set means, a one-way mechanism operable to intermittently actuate the control means by the timed means, but inoperable upon operation of the manual means.

Other objects not specifically recited hereinabove will become manifest with a reading of the following specification reference being had to the accompanying drawing in which Figure 1 is a schematic view of a temperature control system wherein the temperature control means of this invention is utilized, Figure 2 is a side elevation of the temperature control means as shown mounted on a vertical wall or the like, Figure 3 is a front elevation of the temperature control means as shown mounted in Figure 2, Figure 4 is a detailed view of the cam means and the follower, and Figure 5 is a fragmentary view of the contact carrying member and the interrupter arm, and Figure 6 is a fragmentary view of the casing for the temperature control instrument.

Referring to Figure 1, the numeral 10 generally designates a furnace of a well known warm air type having a bonnet (not shown) and an air duct 11 leading therefrom which communicates with a space 12 which is heated by air warmed in the bonnet and transferred to the space 12 through the duct 11.

Fuel is fed to the furnace 10 by stoker 13, the operation of which is controlled by a thermostat generally designated by the numeral 14, situated in space 12. The thermostat 14 comprises a bimetallic element 15 movable in response to variations in the temperature value of space 12 and a contact carrying member 16 secured thereto for movement therewith. The member 16 carries a pair of movable contacts 17 and 18 sequentially engageable with fixed contacts 19 and 20 respectively.

Thermostat 14 controls the energization of a relay generally designated 21 which is supplied by a transformer generally indicated by the numeral 22. Transformer 22 comprises a secondary winding 23 and a primary winding 24 connected to a suitable A. C. source (not shown).

The relay 21 comprises a relay coil 25, an armature 26 actuable thereby, and a pair of switches 27 and 28 in turn actuated by the armature 26. Energization of relay coil 25 causes movement of armature 26 to the left, and movement of switch blades 29 and 30, operatively connected with armature 26, into engagement with fixed contacts 31 and 32 of switches 27 and 28 respectively. When the coil 25 is deenergized, the switches return to their open positions as shown, by means of any suitable biasing means (not shown). From the foregoing it should now be apparent that the thermostat 14 and the relay 21 are of the well known holding type and that the switch 27 is for the purpose of maintaining the energization of coil 25 and thereby holding the switch 28 in a closed condition for a definite period of time as determined by the differential of the thermostat 14. The switch 28 controls the energization of the stoker 13 which is supplied by a suitable source of power through supply lines 33 and 34, the switch 28 being inserted between the supply line 33 and the stoker 13.

In the operation of Figure 1, with the parts in their positions as shown, the temperature of the space 12 is at or above a normal value in which case the thermostat 14 is satisfied. When the temperature in the space 12 drops, the member 16 sequentially engages the contacts 19 and 20 respectively, which completes a circuit for energizing the coil 25 as follows: From secondary winding 23 through a conductor 35, contact 19, member 16, contact 20, a conductor 36, coil 25 and a conductor 37 back to secondary winding 23. The switch 27 is then closed which completes a second circuit for energizing coil 25 as follows: from secondary winding 23 through conductor 35, contact 19, member 16, bimetallic element 15, a conductor 38, blade 29, contact 31, a conductor 39, coil 25, and a conductor 37 back to secondary winding 23. The switch 28 closes simultaneously with the closing of switch 27 and completes a circuit to the stoker 13 as follows: from the source of power through the supply line 33, fixed contact 32, switch blade 30, a conductor 40, stoker 13, and supply line 34 back to the source of power. The stoker 13 then operates to feed fuel to the furnace 10, the combustion of the fuel creating heat which eventually is dissipated in the space 12. When the temperature in the space 12 rises to a predetermined point, the member 16 moves out of engagement with the fixed contact 20 whereupon the first circuit for energizing the coil 25, as traced hereinabove, is opened. However, the second circuit for energizing coil 25 is still complete, the switches 27, 28 are closed, and the stoker 13 continues to operate to supply heat to the space 12 until the temperature therein rises to the normal value whereupon the member 16 moves out of engagement with the fixed contact 19. The holding circuit energizing the coil 25 is then opened, and the switches 27, 28 return to their open positions, thus terminating operation of the stoker 13. However, because of the time delay in transferring the heat from the furnace 10 to the space 12, which is an inherent characteristic of all heating apparatus, and particularly because of the fact that the stoker 13 feeds fuel to the furnace 10 at a rate in excess of the combustion rate thereof, a mass of unburned fuel has accumulated after the operation of the stoker 13 has been terminated. The residual heat thereafter created by the continued burning of the accumulated mass of fuel in the furnace continues to raise the temperature of the space 12 above the normal value thereof thereby creating the objectional condition commonly referred to as "overshooting." Such a condition is particularly present when the demand on the furnace necessitates prolonged operation thereof over an extended period, as in the case of a morning pick-up period for example. The purpose of this invention is to provide means associated with the thermostat 14 for providing intermittent operation of the stoker 13 when the thermostat 14 responds to a condition in space 12 indicative of a need for a prolonged operation of the stoker 13. The residual heat stored in furnace 10 as a result of the operation of the stoker 13 during such intermittent periods being thus utilized in raising the temperature of the space 12 to its normal value and preventing an overshooting thereof.

While in Figure 1 I have illustrated a particular condition control system, I wish it to be understood that the control means of this invention is applicable to any condition control system having an inherent time lag. For example, the control means may be applicable to a heating system in which a hot water or steam furnace employing an oil or gas burner as well as a stoker is used. The control means may also be applicable to control a motor operator in control of the usual check and draft dampers of a furnace or of a valve in a heating supply line.

Referring now to Figures 2 and 3, it will be seen that the thermostat 14 is of the day-night type, the bimetallic element 15 being movable between day and night settings. The thermostat 14 is generally similar to the thermostat described and claimed in my co-pending application Serial No. 137,725, filed April 19, 1937, entitled "Thermostat," which has matured into Patent No. 2,280,651, granted April 21, 1942. Accordingly, the instrument will be described but briefly herein, reference with respect to details of construction being had to the aforesaid copending application. The thermostat 14 comprises a base 41 and an insulation plate 42 supported thereon and riveted thereto. A bracket 43 suitably secured to the plate 42 pivotally supports the bimetallic element 15 at 44 for swinging movement parallel with the base 41. The element 15 is U-shaped having the contact carrying member 16 riveted thereto at one end thereof as best seen in Figure 5. The member 16 is bifurcated, the outer furcation (see Figure 3) being bent back at the base and doubled back at the tip to accommodate a resilient finger 45 which carries the movable contact 17. The fixed contacts 19 and 20 are adjustably carried by rigid supports 46 and 47 respectively, which are suitably secured to the insulation plate 42. The other end of element 15 is operatively linked to a lever 48 by means of an insulation piece 49, the lever 48 being pivotally supported on the base 41 at 50 for swinging movement parallel to the base 41. The other end of lever 48 carries a screw 51 which engages a cam 52 supported on base 41 for rotation about the axis 53. An indicia bearing dial 55 is connected to cam 52 for rotation therewith about the axis 53 and cooperates with a pointer 54 integrally formed with the base 41 to indicate a position of element 15 providing a particular temperature controlled point of the space 12. It will be understood that movement of the dial 55 provides an adjustment of the element 15 over a range of values providing daytime temperature control of the space 12.

A casing 56 suitably secured to the base 41 contains a clock mechanism (not shown) which preferably is of the type disclosed in Andrew G. McNicoll Patent No. 2,108,776, issued February 15, 1938, entitled "Starting mechanism." The clock mechanism comprises a winding stem 57 which may be manually rotated by means of a handle 58 operatively secured to the stem 57 to set the mechanism in operation for a predetermined time period, which for the purposes of this invention may be in the neighborhood of 11 or 12 hours. The mechanism further comprises a slip friction mechanism which permits reverse manual movement of the stem 57 for purposes of resetting the clock mechanism in the case of an over-winding of the stem 57.

A lever 59 freely mounted on the stem 57 is provided with an upturned ear 60 which extends upwardly through a slot 61 formed in a disc 62 which is concentric with the stem 57. The disc 62 is provided with a hub 63 which is secured for rotation with the stem 57 by means of a screw 64. A spring 65 is wound about the hub 63 and connected at one end to the ear 60 and at the other end to the screw 64. The spring 65 is wound about the hub 63 in such a manner as to bias the lever 59 in a counter-clockwise direction. With the parts in their positions as shown in Figure 3, the clock mechanism is inoperative and the distal end 66 of lever 59 engages an abutment 67 on lever 48 to resiliently urge the screw 51 into engagement with the cam 52. It will be noted that the ear 60 is some distance from the leading edge 68 of the slot 61 which permits movement of the lever 48 by action of the cam 52 on the screw 51 in adjusting the operating point of the instrument over the daytime range. It will be further noted that the ear 60 is at a considerable distance from the trailing edge 69 of the slot 61. Accordingly, the disc 62 moves relatively with respect to the lever 59 when the stem 57 of the clock mechanism is moved clockwise to set the clock mechanism in operation. When the disc 62 has moved through the distance between the ear 60 and the trailing edge 69 of the slot 61, the disc 62 picks up the lever 59 which then moves out of engagement with the abutment 67. The element 15 then pivots about the pivot 44 in a counter-clockwise direction by action of a compression spring 70 which is suitably mounted between the bracket 43 and the element 15. Accordingly, because of the connecting link 49 between element 15 and lever 48, lever 48 also pivots counter-clockwise about its pivot 50 until a screw 71 carried by a lever 72, also pivotally supported at 50, engages a cam 73. Cam 73 is also mounted for rotation about the axis 53 of cam 52 and is operatively connected to an indicia bearing dial 74 which also cooperates with the pointer 54 to indicate a position of element 15 providing a particular control point of a range of values covering night time operation of the instrument. The lever 72 is biased towards the lever 48 by means of a spring 75, movement in that direction being limited by engagement of abutments 76 and 77 provided on the levers 48 and 72 respectively. It should be understood that spring 75 is stronger than spring 70 and that lever 72 acts as an integral part of lever 48 in adjusting the element 15 when in its night time position. Accordingly, the spring 75 does not yield by action of the spring 70 in urging the element 15 in a counter-clockwise direction. However, the spring 75 does yield when an attempt is made to adjust the instrument to a higher night time value than the existing daytime value as described in my copending application referred to hereinabove.

An indicia bearing dial 78 is frictionally connected to the winding stem 57 by means of a flexible blade 79. The connection between the dial 78 and the stem 57 is such that the dial normally rotates with the stem 57, but may be moved relatively with respect thereto by manually moving a knob 80 operatively connected with the dial 78. The indicia on the dial 78 appears through a window 81 formed in the thermostat casing 82 and cooperates with a pointer 83 formed integrally with the casing 82 to indicate the duration of operation of the clock mechanism as will hereinafter appear.

Rigidly secured to the base 41 is a post 84 provided with a pivot pin 85 upon which is pivoted a lever 86. Lever 86 is confined to limited axial movement with respect to the pin 85 by means of a lock washer 87. The lever 86 is spaced with respect to the casing 56 by means of a sleeve 88 through which extends a screw 89 which is received in the casing 56, as best seen in Figure 5. The screw 89 extends through an arcuate slot 90 concentrically formed in lever 86 with respect to the pivot pin 85. Thus, the lever 86 is free to swing about the pivot pin 85 sufficiently to actuate the contact carrying member 16. For this purpose the free end of lever 86 is struck up at right angles adjacent the lower furcation of contact carrying member 16, as best shown in Figure 5. The lever 86 is conveniently insulated from the member 16 by means of a piece of tubular insulation 91 which is slipped over the turned up end of lever 86.

As will be seen in Figure 4, the disc 62 carries a cam 92 which is provided with a series of equally spaced radial projections 93. The projections 93 are arranged concentrically with respect to stem 57 and are engageable with a follower pin 94, secured to a struck-up portion 95 of the lever 86. Under certain conditions to be pointed out hereinafter, the projections 93 provide intermittent movement of the lever 86 and therefore the member 16 to intermittently disengage the contacts 17, 18 from their respective fixed contacts 19 and 20. It will be understood that the arrangement of lever 86, cam 92, insulation piece 91, and member 16 is such that the contacts 17, 19 and 18, 20 are engageable when the parts are in the position shown in Figure 3 and that the contacts are disengaged when the follower pin 94 occupies the position with respect to a projection 93 as shown in Figure 4.

The cam 92 is secured to the disc 62 by means of rivets 96 which extend through slots 98 provided in the cam 92. The slots 98 provide a lost motion connection between the disc 62 and the cam 92. It will be noted that the lower portions of the slots 98 are at a greater radial distance from the center of rotation of the disc 62 than the upper portions of the slots. Accordingly, with the parts in the position as shown in Figure 3, movement of the disc 62 in a clockwise direction to set the clock mechanism in operation causes inward movement of the cam 92 with respect to the disc 62, since the pin 94 resiliently bears against one of the projections 93. This causes the cam 92 to move inwardly sufficiently to clear the pin 94. The provision of the inward movement of the cam 94 is for the purpose of providing a one-way mechanism for actuating lever 86 and thereby preventing rapid recycling of the heating system should the contacts be closed at the time the clock mechanism is set in operation. It will be further noted that the upper portions of the slots 98 are formed, arcuately with respect to the disc 62. This is for the purpose of preventing inward movement of the cam 92 when the disc drives the same in a counter-clockwise direction and the pin 94 exerts a radial thrust against the rivets 96, as shown in Figure 4.

With the parts of the thermostat in the position shown in Figure 3, the clock mechanism is inoperative, the element 15 is in its daytime position and the space 12 is at or above a temperature of 70° F. If it is now desired to shift the element 15 to its night time position in which the space 12 will be controlled at a temperature of 50° F., as shown by dial 74, and if this change be made at ten o'clock in the evening, for example, the knob 80 is rotated until the numeral 10 on dial 78 appears in the window 81, the dial 78 moving frictionally relatively to the winding stem 57. If it is further desired that the temperature of the space 12 be brought back to 70° F. at, say eight o'clock in the morning for example, the handle 58 is wound clockwise, the dial 78 moving with it, until the numeral 8 on the dial 78 appears in the window 81. During this setting of the clock mechanism the cam 92 is moved clockwise past the pin 94 without actuating the contacts, as described hereinabove. Likewise, lever 59 moves away from abutment 67 permitting the thermostat to move to its night setting as previously explained. The thermostat 14 then operates on a night time setting until the first projection 93 of the cam 92 engages the pin 94. At this time the lever 59 reengages the abutment 67 and shifts the element 15 to its daytime setting. Since the temperature in the space is undoubtedly low at this time, the contacts 17, 19 and 18, 20 are engaged and the stoker 13 is set in operation, after which the furnace operates to supply additional heat to space 12. In spite of the fact that the thermostat 14 is now set to respond to a condition existing in space 12, namely the need for raising the temperature of the space 12 from 50° to 70° F., which condition is indicative of a need for prolonged operation of the stoker 13, the clock mechanism acts independently of the temperature in the space 12 and furnace 10 through the cam 92 and interrupter lever 86 to intermittently open the thermostat contacts to thereby control operation of the stoker 13 in a series of "off" and "on" periods until the last projection 93 has passed the follower pin 94 as shown in Figure 3. By thus interrupting prolonged operation of the stoker 13, overshooting of the space 12 is very substantially prevented and the residual heat stored in furnace 10 during the intermittent operation of stoker 13 is utilized to great advantage in raising the temperature of the space from the relatively low night time value to the normal daytime value.

In practice, an hour and 45 minutes has been found to be a satisfactory morning pick-up period. In other words, an hour and 45 minutes of operation of the clock mechanism remains from the time the first projection 93 of the cam 92 engages the follower pin 94, after which four "off" periods and three "on" periods follow. In practice, with the cam 92 designed as shown, the "off" periods average 15 minutes and the "on" periods average 14 minutes. It will be noted that as each projection 93 climbs forward over the pin 94, the cam 92 is urged forwardly of the disc 62 due to the biasing action of element 15 in a contact engaging direction. This accounts for the "on" periods being nearly as long as the "off" periods despite the fact that the periods during which pin 94 would otherwise be in the bottom of the dwells between the projections 93 would be relatively small as compared with the periods during which it would be riding on the projections 93 so as to separate the contacts. It will be further noted that with the thermostat 14 mounted on a vertical wall as shown, the interrupter lever 86 and cam 92 have a tendency to return to the position as shown in Figure 3 by means of gravity. If it is desired, however, any suitable biasing spring may be used to return the members to such position.

It should also be noted that the interrupter mechanism does not interfere with the free movement of the element 15 in a counter-clockwise direction. Consequently, if the temperature of the space 12 reaches its day time value at a time when the second projection 93, for example, has just passed the pin 94, continued actuation of the lever 86 has no effect whatever on the operation of the stoker 13. Thus, it will be understood that the interrupter mechanism is operative to provide intermittent operation of the stoker 13 only when the thermostat 14 responds to a condition of space 12 indicative of a need for operation of the stoker 13.

From the foregoing it is now apparent that I have provided a means capable of accomplishing the functions and objects set forth hereinabove. While I have illustrated certain embodiments of this invention, I do not wish to be strictly limited thereto, but contemplate all such changes, omissions, substitutions, additions, and alterations as will naturally occur to those skilled in the art without departing from the scope or spirit of this invention as defined by the appended claims.

I claim as my invention:

1. In a heating system, means for heating a space, an element movable in response to variations in the temperature of said space, switch means actuable thereby, circuit connections controlled by said switch means when closed to initiate operation of said heating means and when opened to terminate operation thereof, means for selectively rendering said element operable to close said switch means in response to a first range of temperature values of said space, visual means for indicating the selected value of said first range, mean for selectively rendering said element operable to close said switch means in response to a lower range of temperature values of said space, visual means for indicating a selected value of said lower range, means for rendering said element responsive to said lower range of values for a predetermined period of time and responsive to said first range of values at the expiration of said period of time, means operable independently of said element and independently of variations in the temperature of said space for opening said switch means in a sequence of predetermined intervals extending over a second predetermined period of time following the expiration of said first period, and visual means for indicating the total duration of said first and second periods.

2. In a condition control system, a condition changer, means responsive to variations in the value of said condition for controlling operation of said condition changer, and timing means associated with said control means for intermittently removing the same from control of said condition changer to prevent operation thereof during predetermined intervals extending in a sequence over a predetermined period of time during which said condition changer operates to change said condition from one value to a substantially different value and during which it would otherwise tend to operate continuously for much longer periods than those existing between said intervals.

3. In a heating system, means for heating a space, means responsive to variations in the temperature of said space for controlling operation of said heating means, said control means being movable between first and second operating positions corresponding to first and second temperature ranges of said space to be maintained by said control means, timed means for moving said control means between said first and second positions, and means operable by said timed means for controlling operation of said heating means when the same operates to change the temperature of said space from said first to said second range.

4. In a heating system, means for heating a space, means responsive to variations in the temperature of said space for controlling operation of said heating means, said control means being movable between first and second operating positions corresponding to first and second temperature ranges of said space to be maintained by said control means, connections by which said control means initiates operation of said heating means when the temperature of said space falls below a value of said first or second range and terminates operation thereof when the temperature rises above said value of said first or second range, timed means for moving said element between said first and second positions, and means operable by said timed means for actuating said control means to intermittently interrupt operation of said heating means when the same operates to change the temperature of said space from said first to said second range.

5. In a heating system, means for heating a space, means responsive to variations in the temperature of said space for controlling operation of said heating means, said control means being movable between first and second operating positions corresponding to first and second temperature ranges of said space to be maintained by said control means, means for independently adjusting said first and second operating positions, manual means for moving said control means from said first to said second operating position, timed means for moving said control means from said second to said first position, and means operable by said timed means for controlling operation of said heating means when the same operates to change the temperature of said space from said second to said first range.

6. In a condition control device, an element responsive to variations in the value of a condition, switch means operable thereby, a timed means, means operable by said timed means for controlling said switch means independently of said element and of variations in the value of said condition, said independent means being operable by said timed means to intermittently actuate said switch means in a sequence of predetermined intervals extending over a predetermined period of time.

7. In a condition control device, an element responsive to variations in the value of a condition, switch means operable thereby, said element being movable between first and second operating positions wherein it operates said switch means so as to maintain first and second condition values, timed means for moving said element between said first and second positions, and means operable by said timed means for intermittently actuating said switch means when said element is moved to one of said positions.

8. In a heating system, means for heating a space, means responsive to variations in the temperature of said space for controlling operation of said heating means, said control means being movable between first and second operating positions corresponding to first and second temperature ranges of said space to be maintained by said control means, manual means for moving said control means from said first to said second operating position, timing means set in operation by said manual means, means for predetermining the period of operation of said element in one of said positions, and means operable by said time means for intermittently actuating said control means at the expiration of said period.

9. In a condition control device, an element responsive to variations in the value of a condition, switch means operable thereby, said element being movable between first and second operating positions wherein it operates said switch means so as to maintain first and second condition values, a timed means, a manual means for moving said element from said first to said second position and operable to set said timed means in operation, said timed means being operable to move said element from said second to said first position after a predetermined period of operation thereof, and means operable thereafter by said timed means for intermittently actuating said switch means in a sequence of predetermined intervals extending for the duration of operation of said timed means.

10. In a thermostat, temperature responsive means movable between day and night settings for controlling temperature values thereof, time means associated therewith for moving said responsive means from said night to said day setting, and means operable by said timed means for intermittently disabling said responsive means over a predetermined period following the return thereof to said day setting.

11. In a thermostat, temperature responsive means movable between day and night settings, control means operable thereby, timed means for moving said responsive means from said night to said day setting, and means operable by said timed means for intermittently actuating said control means in a sequence of predetermined intervals extending over a predetermined period of time following the return of said responsive means to the day setting thereof.

12. In a thermostat, a base, a temperature responsive means pivotally supported thereon and movable between day and night settings, switch means operable thereby, timed means supported on said base for moving said responsive means from said night to said day setting, and lever means pivotally supported on said base and engageable with said switch means, said lever means being operable by said timed means for intermittently actuating said switch means in a sequence of predetermined intervals extending over a predetermined period of time following the return of said responsive means to the day setting thereof.

13. In a thermostat, a base, a temperature responsive means pivotally supported thereon and movable between day and night settings, switch means operable thereby, timed means supported on said base for moving said responsive means from said night to said day setting, cam means secured to said timed means for rotation therewith, a lever pivotally supported on said base engageable with said switch means, means carried by said lever engageable with said cam means and actuable thereby for intermittently actuating said switch means when said responsive means is returned to the day setting thereof.

14. In a thermostat, a base, a temperature responsive means pivotally supported thereon and movable between day and night settings, switch means operable thereby, manual means for moving said responsive means from said day to said night setting, time means, said movement of said manual means setting said timed means in operation, means operable by said timed means to return said responsive means to said day setting after a predetermined period of operation of said time means, cam means operable by said timed means, said cam means having a series of spaced projections, a lever pivotally supported on said base engageable with said switch means, and follower means carried by said lever engageable with said projections on said cam means, said cam means being radially retractable with respect to said timed means with manual movement thereof, and said cam means being operable by action of said timed means to intermittently actuate said switch means when said responsive means returns to the day setting thereof.

15. In condition control mechanism, an element responsive to variations in the value of a condition, a control device operable thereby, said element being movable between first and second operating positions wherein it operates said control device so as to maintain first and second condition values, means for moving said element between said two positions including a reversibly movable member, means for moving said member in opposite directions to cause said element to be moved between said first and second operating positions, means including a cam element carried by said reversible movable member for causing intermittent operation of said control device upon said element returning to said first position by reason of the movement of said member in one direction, and means for causing said cam element to be ineffective when said member is moving in the opposite direction.

16. In condition control mechanism, an element responsive to variations in the value of a condition, a control device operable thereby, said element being movable between first and second operating positions wherein it operates said control device so as to maintain first and second condition values, means for moving said element between said two positions including a reversibly movable member, means for moving said member in opposite directions to cause said element to be moved between said first and second operating positions, means including a cam element carried by said reversibly movable member for causing intermittent operation of said control device upon said element returning to said first position by reason of the movement of said member in one direction, and means for causing said cam element to move to an inoperative position when said member is moving in the opposite direction.

17. In condition control mechanism, an element responsive to variations in the value of a condition, a control device operable thereby, said element being movable between first and second operating positions wherein it operates said control device so as to maintain first and second condition values, means for moving said element between said two positions including a reversibly movable member, means for moving said member in a first direction to cause said element to be moved to said second operating position, timing means for moving said member in the opposite direction to cause said element to be returned to said first operating position at the end of a timed period, means including a cam element carried by said member for causing intermittent operation of said control device upon said element returning to said first position, and means for causing said cam element to be ineffective when said member is moving in said first direction.

CARL G. KRONMILLER.